Oct. 24, 1967     H. HINSKEN ETAL     3,348,760

SUSPENDIBLE FLAT BAG

Filed July 7, 1966

*INVENTORS*
HERMANN HINSKEN
GEORG TRZECIAK
EWALD RASEL

James E. Bryan
ATTORNEY

United States Patent Office 3,348,760
Patented Oct. 24, 1967

3,348,760
SUSPENDIBLE FLAT BAG
Hermann Hinsken, Wiesbaden-Biebrich, Georg Trzeciak, Wiesbaden-Schierstein, and Ewald Rasel, Wiesbaden-Biebrich, Germany, assignors to Kalle Aktiengesellschaft, Wiesbaden-Biebrich, Germany, a corporation of Germany
Filed July 7, 1966, Ser. No. 563,577
Claims priority, application Germany, July 10, 1965, K 56,590
6 Claims. (Cl. 229—53)

The present invention provides a flat bag from sealable film, preferably composite film, at least one edge of which is closed by means of a welding seam and the margin of which is provided with a slot-shaped perforation for suspending the bag. The upper limit of the perforation is a straight line or a line curved in the direction of the inner bag which at both ends has an increased curvature in the direction of the inner bag, being at least such that the ends of the perforation run toward each other and in the same direction as does the imaginary connecting line between them but do not meet, so that the flap of film limited by the perforation between the ends thereof remains connected with the bag. In a preferred embodiment of the present invention, the curvatures at the ends of the slot-shaped perforation are such that the ends again run toward the margin of the bag and form an obtuse angle with each other.

It is known to provide flat bags, in order to make them capable of being suspended, with perforations either at opposite points in the bag walls or in the welding seam. For this purpose, punched-out holes, either circular or oblong having rounded ends, have been used, or slot-shaped perforations with ends bent vertically downwardly, the flap of the film limited by the slot being retained. The latter slot-shaped perforations also have been made semi-circular. The inner flap limited by the slot-shaped perforation is pushed away when the rod used for suspension is introduced, so that a hole is provided.

Although suspending flat bags by means of circular punched-out holes in the margin of the bag is satisfactory insofar as the load capacity of the suspended bag is concerned, substantial difficulties arise in the production of such bags, resulting from the necessity of removing the punched-out parts. In such a case, troubles in the operation of the machine easily occur, particularly when punching out under conditions of elevated temperatures, as is usual, since in this case the punched-out parts easily stick to one another. When circular punched-out holes of sufficient diameter are to be made in the welding seam, an excessively wide welding seam is necessary, which results in an increase in the material required. In order to avoid such an increase in material, only very small holes can be made with the usual width of welding seam. When making a slot with ends bent vertically downwardly or a semicircular slot, a wider aperture is possible with a comparatively narrow margin, but it has been found that such a form, in most cases exhibits a substantially lower load capacity than do circular punched-out holes. This results because, after suspending the bag, peak tensions resulting from the stress occur in the ends of the cut or punched parts, which soon destroy the bag when it is made of material having a low tear strength.

The present invention provides a bag having in its margin one or more perforations for suspension. In the manufacture of the bag, no punched-out parts must be removed and the bag has a sufficient size and load capacity with a welding seam of usual width.

Particularly satisfactory results are achieved if the walls of the bag are welded together at least in the zone of the perforations. This is best realized when the perforations of the present invention are provided in the welding seam. A further increase in the tear strength of the perforations is achieved if the edges thereof, which in the conventional type may have hairline cracks caused by punching out, are fused. The simplest way to attain this is to use a heated punching tool.

The advantage of the perforations of the present invention is that they combine the desirable features of the prior art perforations and punched-out holes but avoid their disadvantages. The perforations of the present invention have the same load capacity as the round punched-out holes of the prior art and can be manufactured as easily as can the hitherto known slot-shaped perforations with ends bent vertically downwardly, without the necessity of removing punched-out parts.

The invention is further illustrated by reference to the accompanying drawings in which:

FIGURE 1 is a view in elevation of one embodiment of a bag in accordance with the present invention, FIGURES 2 and 3 show modifications of the perforations employed in the bag of the present invention, FIGURE 4 is a view in elevation of another embodiment of the bag of the present invention, and FIGURE 5 is a view in elevation of a still further embodiment of the bag of the present invention.

FIGURE 1 shows a bag with sealing seams on its four sides, the upper sealing seam of which is provided with the perforation of the present invention. The two bag walls 1 and 2 are superposed and have a projecting flap 3 which, after finishing the sealing seams 4 and 5, is designed to simplify the filling of the bag. In the sealing seam 5, there is the perforation 6 for suspending the bag, which perforation is in the form of a kidney in the present case. The bag contains the filling material 7, e.g. sliced sausage, after the filling of which the bag is closed by sealing the seam 8.

Figure 1:
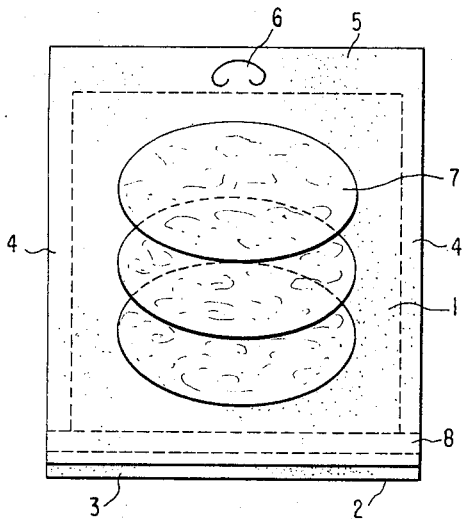
Figure 2:
FIGURES 2 and 3 show further modifications of the perforations 6 of the present invention.
Figure 3:
Figure 4:
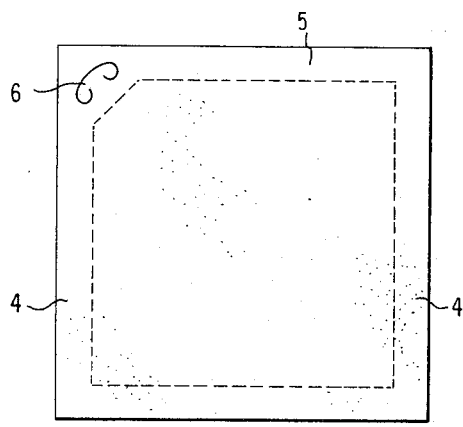
FIGURE 4 shows a bag with sealing seams on its four sides, in which the slot-shaped perforation 6 of the present invention is provided in a sealed corner of the bag. Besides being in the welded seam, as shown in the figures, the perforations 6 of the present invention also may be made inside and outside the welded seam through both bag walls.
Figure 5:
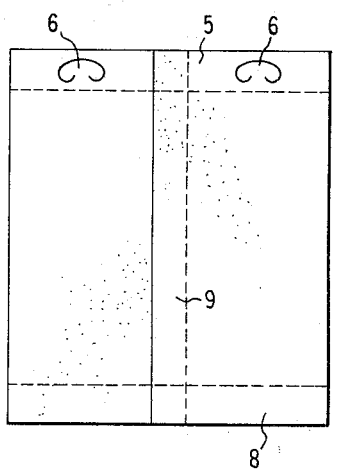

FIGURE 5 shows a bag with two perforations in the welded seam 5, which bag is produced from a flat film in a manner such that first the film is rolled to form a tube which is closed by the longitudinal seam 9 and then by the transverse welded seams 5 and 8.

Materials which are generally used for the manufacture of the bags of the present invention are heat-sealable films or films provided with heat-sealable coatings, such as films from regenerated cellulose coated with polyethylene or polypropylene, polyethylene terephthalate films coated with polyethylene or polypropylene, oriented polypropylene coated with polyethylene, or multi-layer films from cellulose and aluminum with polyethylene as a sealing layer, or from polyethylene terephthalate, aluminum, and polyethylene as a sealing layer.

It will be obvious to those skilled in the art that many modifications may be made within the scope of the present invention without departing from the spirit thereof, and the invention includes all such modifications.

What is claimed is:

1. A bag made from sealable film having a bag body and at least one welded seam with a slot-shaped perforation in the bag margin for suspending the bag, the ends of the perforation being curved in the direction of the bag body to at least such an extent that the ends of the perforation run toward each other but do not meet, whereby a flap delimited by the perforation remains connected to the bag.

2. A bag according to claim 1 in which the ends of the perforation run toward the bag margin.

3. A bag according to claim 1 in which the bag is welded at least in the area of the slot-shaped perforation.

4. A bag according to claim 1 in which the slot-shaped perforation is in the welded seam.

5. A bag according to claim 1 in which the edges of the slot-shaped perforation are fused.

6. A bag according to claim 1 in which the sealable film is a composite film.

References Cited

UNITED STATES PATENTS

| | | | |
|---|---|---|---|
| 1,529,381 | 3/1925 | Townsend | 229—74 |
| 1,569,554 | 1/1926 | Lissner. | |
| 3,154,238 | 10/1964 | Barnhill | 229—55 |
| 3,191,849 | 6/1965 | Gutowski et al. | 229—55 |
| 3,220,610 | 11/1965 | Specketer | 229—62 X |

JOSEPH R. LECLAIR, *Primary Examiner.*

DAVID M. BOCKENEK, *Examiner.*